Aug. 1, 1967  F. J. HERCHER  3,333,474
METHOD AND APPARATUS FOR TESTING ARROWS
Filed Oct. 22, 1965
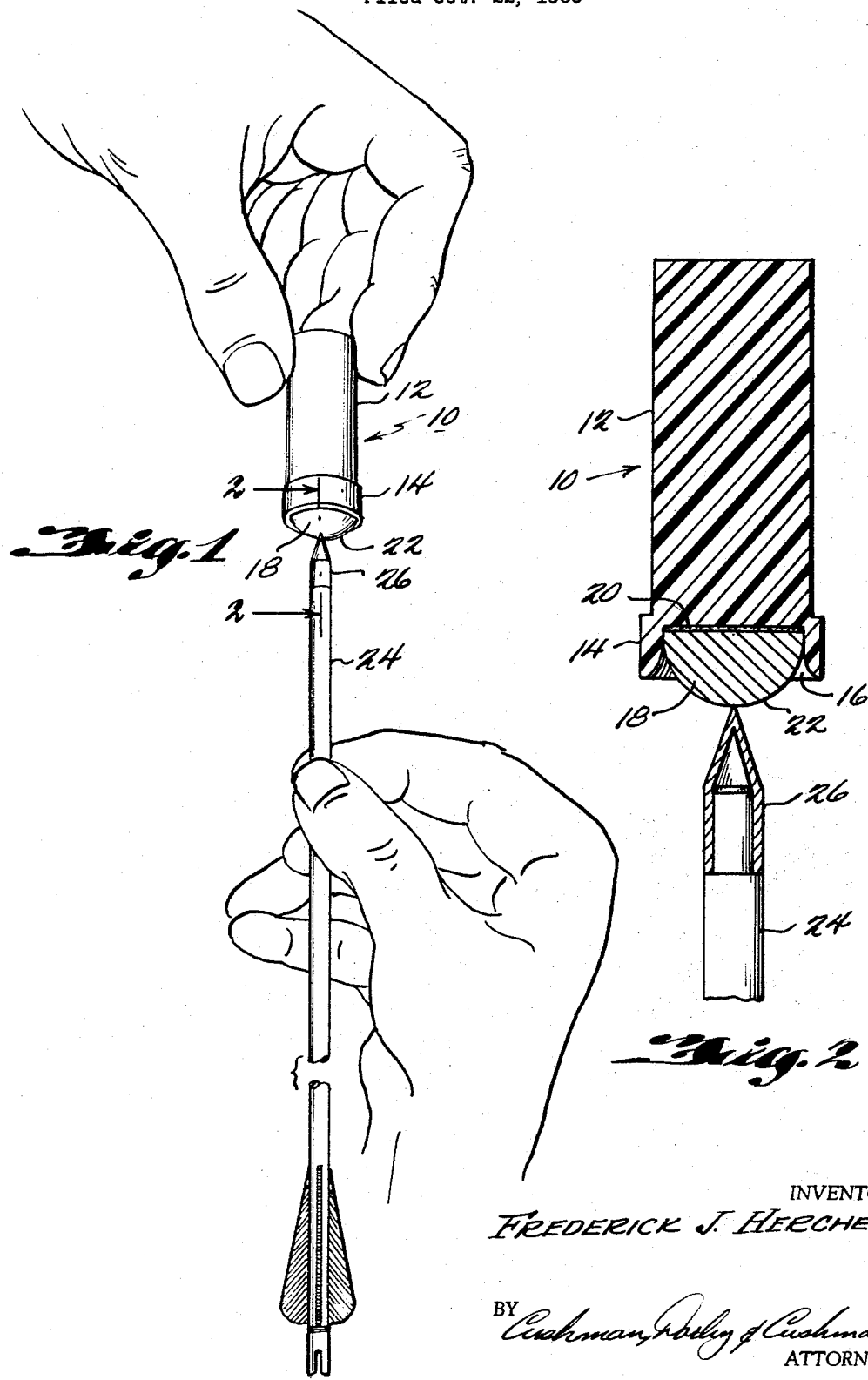
INVENTOR
FREDERICK J. HERCHER
BY Cushman, Darby & Cushman
ATTORNEYS

United States Patent Office 3,333,474
Patented Aug. 1, 1967

3,333,474
METHOD AND APPARATUS FOR TESTING ARROWS
Frederick J. Hercher, 4943 Kamerling St., Chicago, Ill. 60651
Filed Oct. 22, 1965, Ser. No. 500,647
3 Claims. (Cl. 73—460)

This invention relates to a method and apparatus for testing the dynamic balance and the straightness of arrow shafts used for target, field shooting and big game hunting.

Arrows are generally made of aluminum, fiberglass, or wood. At one end of the arrow shaft feathers are provided having either a helical fletch or a regular fletch. The purpose of the feathers is to cause the arrow to spin in flight, to maintain its lateral stability and straight line movement. Since the arrow does rotate when propelled, its dynamic balance is critical to the accuracy of its flight. Of course, shaft straightness is an important factor affecting the dynamic balance of the arrow.

It is frequently the case that new arrows are dynamically out of balance and that used arrows are thrown out of balance due to the impact with a target or by strains on the shafts during shooting. This unbalance adversely affects the performance of the arrow.

It is therefore desirable to provide a simple test by which an archer can readily examine his arrows before shooting. Accordingly, the main object of the present invention is to provide a simple method and device for testing the dynamic balance and straightness of an arrow shaft.

Another object is to provide an economical arrangement for testing arrow shafts which is free of dependency on moving parts.

Further objects in the entire scope of the invention will become more fully apparent when considered in light of the following detailed description of an illustrative embodiment of the invention and from the appended claims.

The illustrative embodiment may be best understood by reference to the accompanying drawings, wherein:

FIGURE 1 is a perspective view of an arrow testing device in operative relationship with an arrow being tested; and FIGURE 2 is a cross-sectional view taken along line 2—2 of FIGURE 1.

Briefly, in a preferred form, the invention comprises the use of a magnetic device having a convex surface. If desired, the magnetic material may be mounted in a suitable holder with the convex surface projecting therefrom. The metallic tip of the arrow to be tested is brought into contact with the convex surface and is magnetically suspended therefrom. Rotation is then imparted to the arrow shaft and unbalance and/or lack of straightness is determined by observation of the free rotation of the suspended arrow shaft.

Referring now to the drawings, FIGURES 1 and 2 illustrate a preferred embodiment of a device for accomplishing the arrow testing. A holder, generally indicated at 10, is shown in FIGURE 1 in the hand of a person performing a test. The holder comprises a substantially cylindrical main portion 12 having at one end thereof an enlarged cylindrical portion 14 of greater diameter than portion 12. The holder 10, although illustrated as a plastic, may be made of metal, rubber or other non-synthetic material. A recess 16 is provided in the end of holder 10 at portion 14. A magnetic element 18, comprising a spherical segment of magnetic material, is inserted within the recess with the planar surface of the segment engaging the bottom of recess 16. The magnetic element 18 is bonded by a suitable adhesive 20 to the holder. The depth of the recess 16 and the size of the spherical segment of magnetic material 18 are chosen so that the convex surface 22 of element 18 projects from the recess.

The arrow testing disclosed herein may only be accomplished with arrows having tips of magnetizable material, such as steel. In FIGURES 1 and 2, a conventional arrow is shown having a shaft portion 24 and a tip 26 of magnetizable material.

Now that the structure of an arrow testing device has been described, the test method will be set forth. Referring to FIGURE 1, when an arrow is to be tested, holder 10 is gripped such that the magnetic element 18 is positioned with its convex surface 22 projecting downwardly. An arrow with a tip 26 of magnetizable material is placed in contact with the convex surface 22 such that the arrow is magnetically suspended therefrom. The arrow shaft is then spun substantially about its longitudinal axis by the tester who, after initiating rotation, releases the arrow shaft. Due to the small amount of friction between the arrow tip and convex surface 22, the arrow freely rotates for an appreciable period of time during which the effects of the tester's initial contact with the arrow disappear leaving the arrow to rotate in a pattern according to its dynamic balance and straightness. If the arrow is dynamically unbalanced, it rotates about an axis through its center of gravity rather than about its geometric axis. Such rotation results in the free end of the shaft being deflected to describe a circle about an axis through the center of gravity of the shaft. This can be easily observed by the tester.

Similarly, when the arrow shaft is not straight, an apparent lateral displacement of the shaft can be observed as it freely rotates in its suspended position.

The above-described embodiment is illustrative of a preferred embodiment of a device for performing the test method of the invention but is not intended to limit the possibilities of insuring a simplified arrow testing device. All that is essential to practising the invention is a magnetic element and an arrow with a magnetizable tip. However, to achieve a low frictional relationship between the suspended arrow and the magnetic element during testing, a convex surface for contact with the arrow tip is preferred. An arrangement, other than that of a convex-surfaced magnet, for accomplishing this would be by the use of a flat magnetic element having a convex cover of non-magnetic material. The test devices disclosed herein are examples of arrangements with which the invention may be utilized, and it will become apparent that certain modifications may be made within the spirit of the invention as defined by the appended claims.

What is claimed is:

1. A method for testing the dynamic balance and straightness of an arrow having a tip of magnetizable material comprising the steps of: magnetically suspending the arrow from its tip and spinning the arrow to permit the arrow to freely rotate about an axis through its center of gravity.

2. A method for testing the dynamic balance and straightness of an arrow having a tip of magnetizable material comprising the steps of: contacting the tip of said arrow with a convex surface of a magnetic device; magnetically suspending the arrow by its tip from said device; and spinning the arrow to permit the arrow to freely rotate about an axis through its center of gravity.

3. An apparatus for testing the dynamic balance and straightness of an arrow having a tip of magnetizable material comprising: a holder having a recess therein and a spherical segment of magnetic material mounted within said recess, the convex surface of said segment being exposed to permit engagement with said arrow tip for magnetic suspension of the arrow from said segment and free rotation of the arrow about its center of gravity during suspension.

References Cited

UNITED STATES PATENTS 2,691,306   10/1954   Beams et al. _____ 73—382 X

FOREIGN PATENTS 743,326   5/1943   Germany.

JAMES J. GILL, *Acting Primary Examiner.*

J. H. WILLIAMSON, *Assistant Examiner.*